Figure 1:
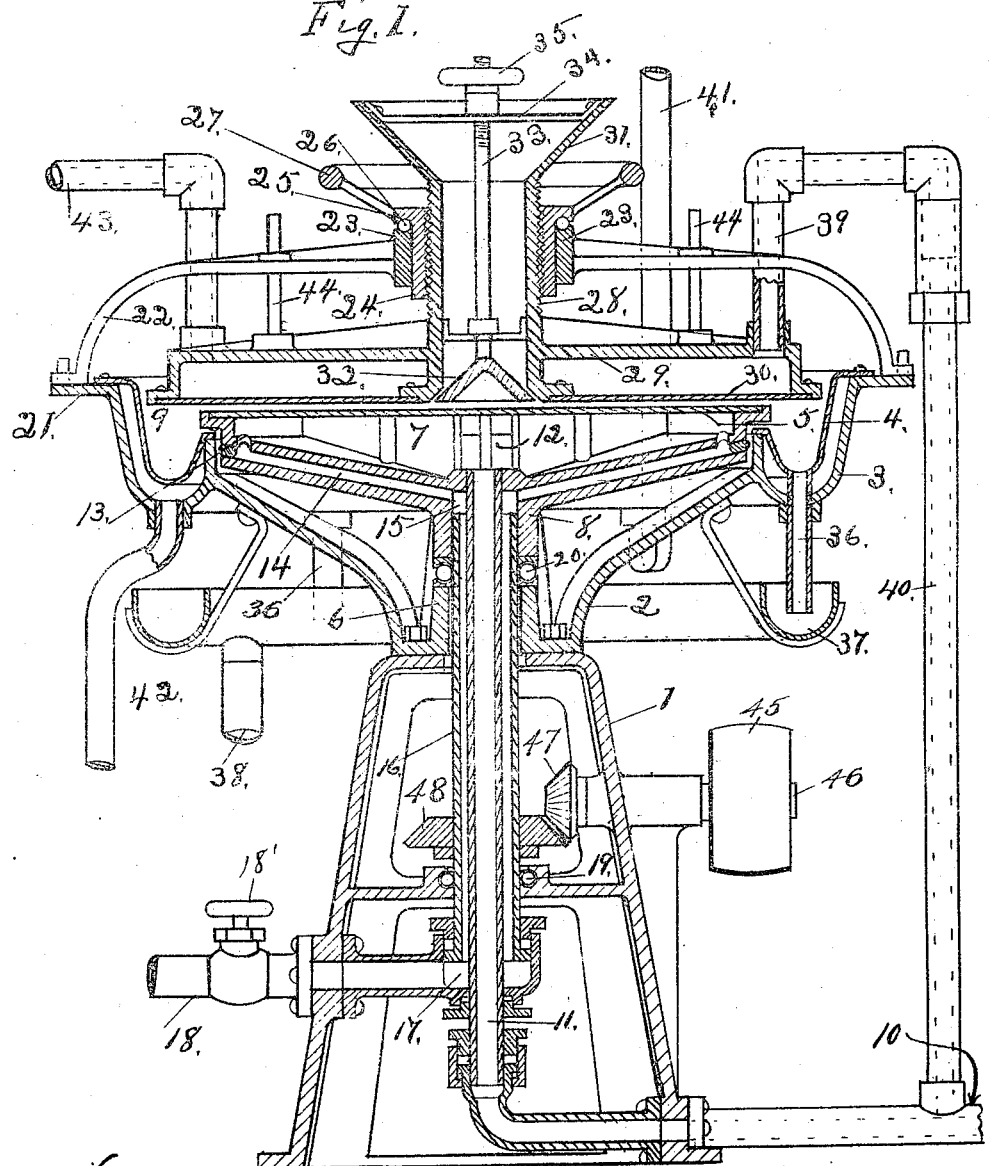

L. S. PFOUTS.
PASTEURIZING APPARATUS FOR MILK AND OTHER LIQUIDS.
APPLICATION FILED JUNE 28, 1906.

990,494.

Patented Apr. 25, 1911.

3 SHEETS—SHEET 1.

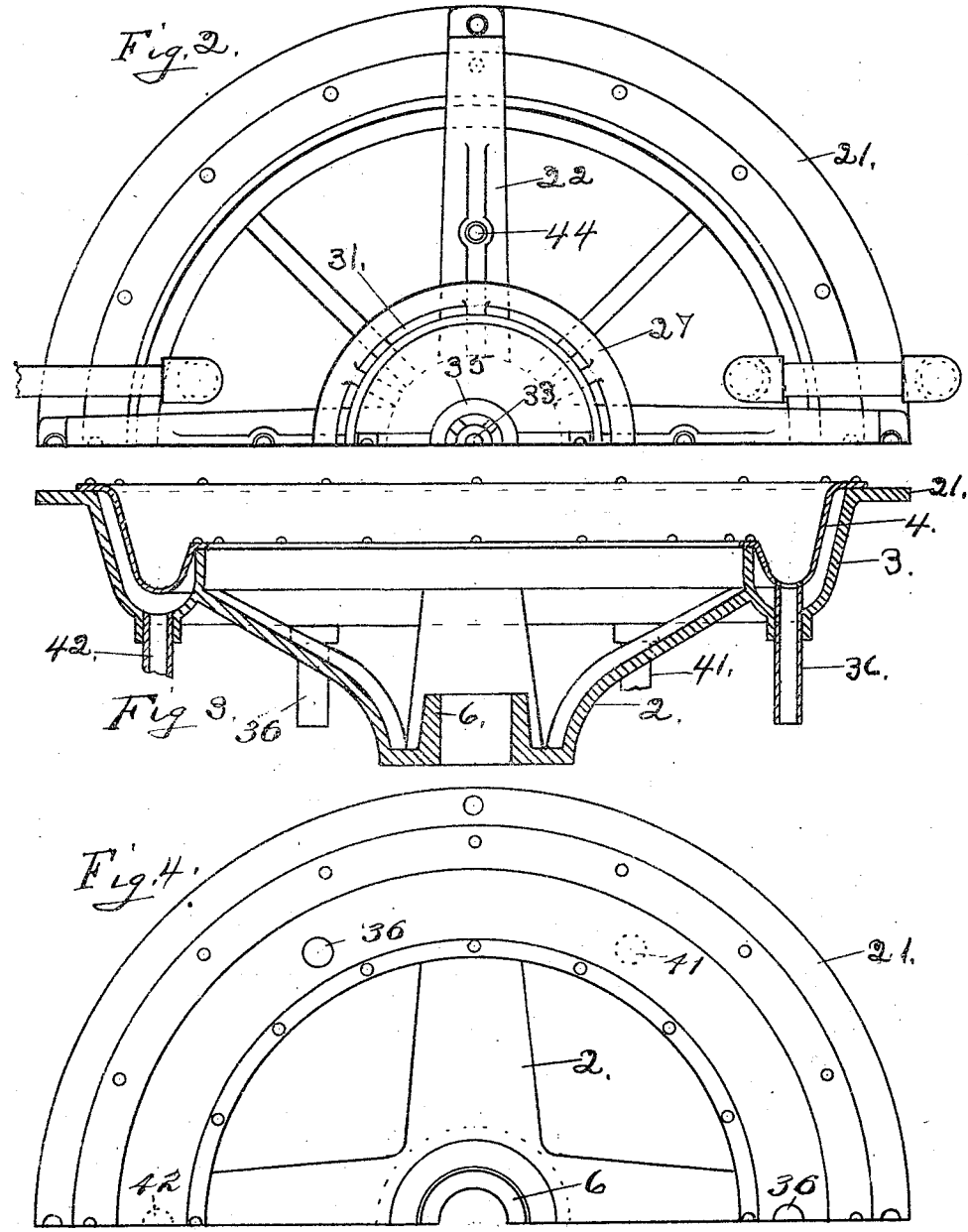

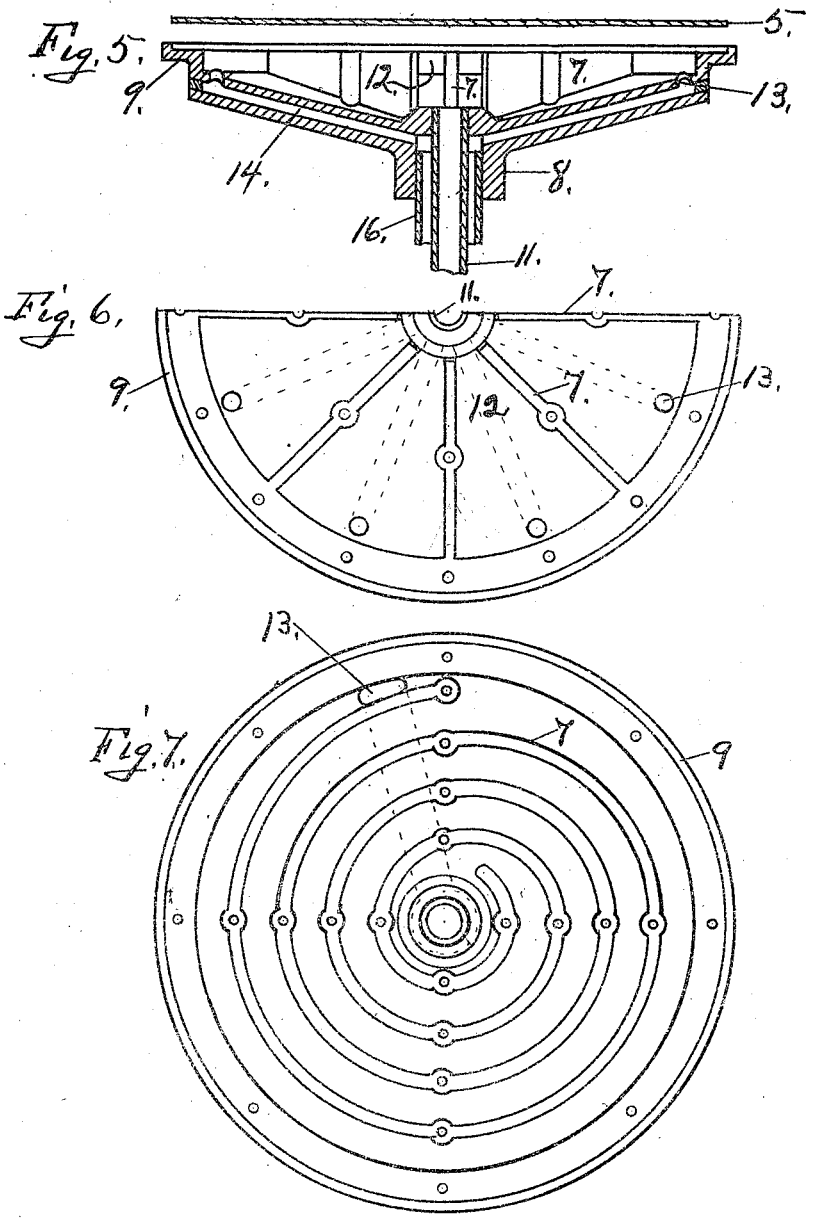

# UNITED STATES PATENT OFFICE.

EROY S. PFOUTS, OF CANTON, OHIO, ASSIGNOR TO THE MILLER PASTEURIZING MACHINE COMPANY, OF CANTON, OHIO, A CORPORATION OF NEW JERSEY.

PASTEURIZING APPARATUS FOR MILK AND OTHER LIQUIDS.

990,494.

Specification of Letters Patent.   Patented Apr. 25, 1911.

Application filed June 28, 1906. Serial No. 323,848.

*To all whom it may concern:*

Be it known that I, LEROY S. PFOUTS, a citizen of the United States, and a resident of Canton, Stark county, Ohio, have invented certain new and useful Improvements in Pasteurizing Apparatus for Milk and other Liquids, of which the following is a specification.

The object of my invention is to provide for the proper pasteurization of milk or other liquids more effectively than is possible by the use of devices now employed. This object I attain in the manner and with the arrangements of parts hereinafter set forth, reference being had to the accompanying drawing in which—

Figure 1 is a vertical section showing the different parts of the pasteurizing apparatus properly arranged. Fig. 2 is a top view showing one-half of the apparatus. Fig. 3 is a vertical section of the liquid cooling and receiving trough and its supporting head. Fig. 4 is a top view of Fig. 3. Fig. 5 is a vertical section of the rotating heating head showing the fluid pasteurizing plate or disk removed and spaced therefrom. Fig. 6 is a top view showing one-half of the rotating heating head and illustrating the pasteurizing plate or disk removed. Fig. 7 is a top view of the rotating heating head showing a modification from that shown in Fig. 6.

In the accompanying drawing 1 represents the base or support, which of course is of sufficient strength and size to properly support and carry the different parts designed to be connected thereto. To the top or upper end of the base 1 is securely attached or formed integral therewith the frame or spider 2, which frame or spider is provided at its periphery with the trough 3 which trough is adapted to receive and hold heating or cooling liquid or material and within which trough is located a second or upper trough 4, which trough is for the purpose of receiving the liquid from the pasteurizing plate or disk 5, as hereinafter described. The spider 2 is provided with the hub 6, upon which hub is mounted a rotating element consisting of radial flanges 7 and a suitable hub 8, and an annular flange 9 to which annular flange and radial flanges is attached the pasteurizing plate or disk 5. The heating or cooling liquid supply pipe 10 leads to any source of supply and of course may be provided with a valve (not shown) if desired. The supply pipe 10 leads to the bottom of the supporting frame 1 and to which is attached the vertical supply pipe 11, which vertical supply pipe extends upward and communicates with the various chambers formed by the radial flanges 7, passages 12 being provided for each chamber formed by the radial flanges 7 by which arrangement the various chambers can be supplied from any source with cooling or heating liquid, which liquid comes in direct contact with the pasteurizing plate or disk 5.

For the purpose of providing for a return or continuous flow of the heating or cooling liquid, apertures 13 are provided at the outer segmental ends of the various chambers, which apertures communicate with the return passages 14, formed in the bottom of the rotating members, which passages lead to and communicate with the chamber 15 from which chamber leads the return pipe 16, which return pipe is of a diameter greater than the diameter of the vertical feed pipe 11, by which arrangement a space is produced between the return pipe and the feed pipe. The return pipe 16 leads to the chamber 17 from which chamber leads the return or waste pipe 18.

18' is a valve for controlling the flow of discharged heating or cooling liquid through the waste pipe 18.

It will be understood that the vertical pipe, and the return pipe rotate with the rotating member just above described, the feed pipe and return pipe being connected at their upper ends to the hub 8, and for the purpose of reducing friction and at the same time properly holding in vertical position the return pipe, the ball-bearings 19 are provided, and for the purpose of reducing friction the hub 8 is mounted upon the ball-bearings 20, which are of common construction and need no detailed description here.

To the flange 21, which flange is extended from the outer periphery of the trough 3 are attached any desired number of upwardly and inwardly extended arms 22 to the inner ends of which are attached or formed integral therewith the supporting ring 23, which supporting ring carries the internal screw threaded sleeve 24, which screw threaded sleeve is provided with the annular flange 25, which annular flange rests upon suitable ball-bearings 26; the ball-bearings, however, being for the purpose of reducing friction, and may be dispensed with if desired. To the sleeve 24 is attached in the ordinary manner the hand wheel 27, which hand wheel is for the purpose of rotating the internal screw threaded sleeve 24. Within the internal screw threaded sleeve 24 is located the hollow and externally screw threaded pipe 28, which pipe is preferably formed integral with the flanged head 29, to which flanged head is attached the stationary or non-rotatable pasteurizing disk or plate 30. It will be understood that by rotating the hand wheel 27 in one direction the pipe 28 together with the different parts carried thereby and especially the pasteurizing plate 30 will be moved downward and toward the pasteurizing plate 5, and by rotating the hand wheel 27 in the opposite direction will elevate the screw threaded pipe 28 and the different parts carried thereby together with the pasteurizing plate or disk 30, thereby increasing the space between the two pasteurizing plates by which arrangement the liquid to be pasteurized can be operated upon between the pasteurizing plates at any pre-determined adjustment, as between the rotating and the non-rotating pasteurizing plates by which arrangement a thin or thick stratum of liquid may be operated upon. The liquid designed to be pasteurized is conveyed into the hopper or funnel 31, which is continued from the top of the pipe 28, the liquid being delivered upon the upper surface of the cone 32, and thence down the inclined surface and on to the rotating plate or disk 5. It will be understood that by providing the cone 32 that the liquid will be conveyed from the axillary center by which arrangement the liquid will fall upon the pasteurizing plate at a point away from or concentric with the axillary center, by which arrangement there can be no amount of liquid remain at rest at the axillary center, but is instantly forced toward the peripheries of the spaced pasteurizing plate by centrifugal force. For the purpose of regulating the space between the bottom of the pipe 28 and the cone 32, said cone is provided with the screw threaded shaft 33, which screw threaded shaft is extended through the bar 34 located in the top or upper portion of the funnel 31, and upon which is located the hand wheel 35. Rotating the hand wheel 35 in one direction will move the cone 32 down and in the opposite direction will move said cone up, thereby providing means for regulating the flow of liquid between the pasteurizing plates. The cone or valve 32 may be drawn up so as to entirely cut off the flow of liquid through the pipe 28. For the purpose of conveying the liquid after it has been properly pasteurized from the upper or second trough 4 the return pipe 36 is provided, which return pipe leads to the receiving trough 37 from thence it is conveyed to the pipe 38 to any desired plate or receptacle. It will be understood that by placing cooling liquid between the upper and lower troughs that the upper trough will present a cool surface and as the pasteurized liquid passes from between the pasteurizing plates it will come in contact with the cool surface, and thereby be instantaneously cooled or in other words I am enabled to provide in a single machine or apparatus, both a heater and a cooler for pasteurizing liquid.

For the purpose of conveying either cooling or heating liquid to the upper or stationary chamber located above the pasteurizing disk or plate 30, the pipe 39 is provided, which pipe is slidably connected to the pipe 40 so that as the pasteurizing plate or disk 30 is moved to or from the rotating pasteurizing plate or disk 5 the pipe 39 will not be disconnected from the pipe 40, which pipe 40 is connected to the pipe 10.

For the purpose of conveying cooling liquid to the trough 3, the pipe 41 is provided, which pipe 41 leads to any cooling or refrigerating system, and leads to and into the bottom of the trough 3, and is conveyed or returned through the pipe 42, which pipe leads from the bottom of the trough 3. This order, however, may be reversed without departing from the nature of my invention.

For the purpose of providing a means for removing any surplus liquid from the chamber located above the pasturizing plate or disk 30, the pipe 43 is provided, which pipe may be located as shown.

For the purpose of preventing any rotation of the flanged plate 29 during the time the hand wheel 35 is being rotated the upright pins or bars 44 are provided, which are securely attached to the flanged plate 29, and are of sufficient length to pass through the apertures 45, formed in the arms 22, and thereby serve the double purpose of guiding the flanged plate 29 and also prevent any rotation thereof, or partial rotation, by which arrangement all strain is removed from the intake and outlet pipes.

In Fig. 7 I have illustrated a modified form of the flanges shown in Figs. 5 and 6, which modified form consists in forming the flanges 7ª spiral, instead of radial.

The operation of the invention is as follows: The liquid designed to be pasteurized is conveyed in any manner to the funnel 31, passing through the tube 28, and in contact with the top or upper face of the cone 32 from whence it passes onto the rotating pasteurizing plate or disk 5, and by centrifugal force is moved toward the periphery of said disk from whence it is delivered into the trough 4, and conveyed through the pipe 36 to the trough 37 and thence to the pipe 38, which latter pipe leads to any receptacle. By providing a means for adjusting the upper or non-rotating plate or disk 30 to and from the rotating disk or plate 5, the stratum of liquid can be and is varied according to the space between the upper and lower faces 5 and 30. By this arrangement as to the adjustment of the upper plate 30 the liquid can be brought into a stratum of any desired thickness, and of course the thinner the stratum the quicker action will take place as to the proper pasteurization of the liquid, or in other words, practically all of the liquid can be brought at one time in direct contact with the faces of the pasteurizing disks, or if desired the stratum may be increased as to thickness and the proportion of the liquid brought into direct contact with the faces of the pasteurizing disks decreased in proportion to the increase of the distance between the two spaced pasteurizing disks.

For the purpose of imparting motion to the parts designed to rotate the power wheel 45 is provided, which power wheel is securely mounted upon the shaft 46, which shaft is provided with the gear wheel 47, which gear wheel meshes with the gear wheel 48. The arrangement as to applying power here described is simply conventional and of course may be varied without departing from the nature of my invention.

It is well known in the art of pasteurizing milk without injuring the cream raising qualities thereof, that it is desirable to remove the heat imparted to the milk during its treatment in the heater as quickly as possible after it is delivered therefrom. With this object in view I have so arranged the inner walls of my cooler that the milk is directed immediately against the cooled surface after it is thrown outward from the periphery of the centrifugal pasteurizing plate. It will be noted that the walls of the cooler can be maintained substantially at a pre-determined temperature by the regulation of the flow of the cooling medium between them or in any other manner.

I am aware of the fact that heretofore it has been proposed to construct a liquid pasteurizing apparatus having a centrifugal pasteurizing plate, one side of which forms the cover for a water chamber, the water being heated to the temperature necessary to impart the desired heat to the pasteurizing plate; such an apparatus for example as shown in the patent to Tyson No. 804,687, granted Nov. 14, 1905; but in this earlier construction the pasteurizing plate was movable relative to the walls of the water receptacle, the latter being stationary, and rests upon the tops of the side walls of the receptacle. I have found that with such a construction the water or steam for heating the same will force its way between the adjacent surfaces of the water receptacle, and the pasteurizing plate and thence into the milk trough. It will be seen that I have avoided the difficulty encountered in the earlier construction by providing a water chamber or receptacle for which the pasteurizing plate forms a top wall, and to which said plate is secured with fluid tight joints, that the water receptacle in my construction rotates with the pasteurizing plate and that it is impossible for steam or vapor from the water receptacle to pass off therefrom through the film of milk delivered from the periphery of the pasteurizing plate. Where with a pasteurizer embodying my invention, steam is used as a heating medium, it enters the receptacle through the duct 11, and the valve 18' in the outlet or waste pipe may be regulated to prevent the escape therethrough of steam and to control the discharge of water from the water receptacle at the desired rate.

While it has been common in the earlier art to use a trough for collecting the heated liquid as it is thrown off from the pasteurizing plate, I believe I am the first to employ this trough as a cooler, and provide means for cooling the walls of the trough so as to normally maintain them at a pre-determined temperature necessary to immediately reduce the temperature in the heated particles of the liquid, thereby retaining and maintaining the cream raising qualities of milk.

Having fully described my invention what I claim as new and desire to secure by Letters Patent, is—

1. A pasteurizing apparatus consisting of a rotatable pasteurizing-plate, means for rotating the plate, a stationary pasteurizing-plate spaced from the rotating pasteurizing plate and adjustable to and from the rotating pasteurizing-plate.

2. A pasteurizing apparatus consisting of a rotatable pasteurizing plate, means for rotating the plate, a stationary pasteurizing plate, a liquid distributing element located above the axillary center of the rotating plate, means for adjusting the liquid distributing element to and from the rotating pasteurizing plate, a rotatable chambered head adapted to carry the rotating pasteurizing plate, and a pasteurizing plate located above the stationary pasteurizing plate.

3. In a pasteurizing apparatus, a chambered head provided with liquid return passages, a pasteurizing plate carried by and rotatable with the chambered head, means for conveying liquid to the rotating pasteurizing plate, and a stationary pasteurizing plate secured to an adjustable chambered plate, and a liquid receiving receptacle, located in the peripheries of the pasteurizing plates.

4. In a pasteurizing apparatus, a rotatable chambered head, flanges located in the chamber of the head, liquid return passages located in the return head, a pasteurizing plate rotatable with the head, a non-rotatable pasteurizing plate, means for adjusting the non-rotatable plate to and from the rotatable one, and means for conveying liquid upon the rotatable pasteurizing plate, and means for conveying the liquid from the axillary center of the rotatable pasteurizing plates.

5. In an apparatus for pasteurizing liquid a horizontally disposed rotatable pasteurizing plate, a water receptacle upon which the said pasteurizing plate is arranged, and to which it is connected by fluid tight joints, said water receptacle having inlet and outlet ports arranged at its axis, means for rotating said water receptacle and pasteurizing plate together, and means for directing the liquid to be treated onto said pasteurizing plate.

6. In an apparatus for pasteurizing liquid, the combination of a rotatable water receptacle having one wall horizontally disposed to receive the liquid to be treated and connected with the other walls of the vessel by fluid tight joint, said water receptacle having inlet and outlet ports arranged at its axis, means for maintaining the water within the receptacle at the desired degree of temperature, means for rotating said receptacle and pasteurizing plate together, and means for directing the liquid to be treated onto said pasteurizing plate.

7. In an apparatus for pasteurizing liquid, the combination of a rotatable pasteurizing plate, a cooler having its cooling surface arranged adjacent to the periphery of said pasteurizing plate, and adapted to engage the particles of liquid as they are thrown from said plate, means for introducing the liquid to be treated upon said plate, means for maintaining the temperature of said plate at the desired degree, means for rotating the plate and means for maintaining the temperature of the cooling surface of the cooler at the desired temperature.

8. In an apparatus for pasteurizing liquid, the combination of a rotatable pasteurizing plate, a cooler having a cooling surface arranged adjacent to the periphery of said pasteurizing plate, and adapted to engage the particles of liquid as they are thrown from said plate, means for introducing the liquid to be treated upon said plate, means for maintaining the temperature of said plate at the desired degree, means for rotating the plate, means for maintaining the temperature of the cooling surface of the cooler at the desired temperature, a pasteurizing plate spaced from the centrifugal pasteurizing plate, and means for adjusting the same to and from said pasteurizing plate.

9. In an apparatus for pasteurizing liquid the combination of a rotatable pasteurizing plate arranged to have the liquid to be treated directed onto it near its center, and delivered at the periphery thereof, means for maintaining the temperature of said plate at the desired degree, a cooler surrounding said pasteurizing plate and arranged to have its cooling surface engage and receive the particles of said liquid after they are thrown from said centrifugal pasteurizing plate, and means for maintaining the temperature of the cooling surface at the desired degree.

10. In an apparatus for pasteurizing liquid the combination of a rotatable pasteurizing plate arranged to have the liquid to be treated directed onto it near its center, and delivered at the periphery thereof, means for maintaining the temperature of said plate at the desired degree, a cooler surrounding said pasteurizing plate and arranged to have its cooling surface engage and receive the particles of said liquid after they are thrown from said centrifugal pasteurizing plate, means for maintaining the temperature of the cooling surface at the desired degree, and an adjustable plate spaced from the centrifugal pasteurizing plate.

11. In an apparatus for pasteurizing liquid the combination of a rotatable pasteurizing plate, means for maintaining the temperature of said plate at the desired degree, a cooler encircling said pasteurizing plate and having its cooling surfaces arranged in the path of travel of the particles of liquid as they are thrown from said pasteurizing plate, and means for maintaining the temperature of said cooling surface to the desired degree.

12. In an apparatus for pasteurizing liquid, the combination of a rotatable pasteurizing plate, a liquid receiving receptacle located around and adjacent to the periphery of the centrifugal pasteurizing plate, and means for introducing cooling medium into and withdrawing it from said receptacle.

13. In an apparatus for pasteurizing liquid, the combination of a rotatable pasteurizing plate, a liquid receiving receptacle located around and adjacent to the periphery of the centrifugal pasteurizing plate, having a cooling surface with which the particles of treated liquid thrown from the periphery of the pasteurizing plate contact, and a non-rotatable plate spaced from the centrifugal pasteurizing plate.

14. In an apparatus for pasteurizing liquid, the combination of a rotatable pasteurizing plate, a liquid receiving receptacle located around and adjacent to the periphery of the centrifugal pasteurizing plate, having a cooling surface with which the particles of treated liquid thrown from the periphery of the pasteurizing plate contact, and a non-rotatable pasteurizing plate adjustable to and from said centrifugal pasteurizing plate.

15. In an apparatus for pasteurizing liquid, the combination of a rotatable heating chamber, said chamber divided into compartments, liquid return passages leading from the different compartments of the rotating chamber, a pasteurizing plate carried by and rotating with the chamber, and a liquid tight joint between the contact edges of the pasteurizing plate and the chamber.

16. In an apparatus for pasteurizing liquid, the combination of a rotatable heating chamber, said chamber divided into compartments, liquid return passages leading from the different compartments of the rotating chamber, a pasteurizing plate carried by and rotating with the chamber, and a liquid tight joint between the contact edges of the pasteurizing plate and the chamber, and a non-rotatable pasteurizing plate spaced from the pasteurizing plate secured to the rotating chamber.

17. In an apparatus for pasteurizing liquid, the combination of a rotatable heating chamber, said chamber divided into compartments, liquid return passages leading from the different compartments of the rotating chamber, a pasteurizing plate carried by and rotating with the chamber, and a liquid tight joint between the contact edges of the pasteurizing plate and the chamber, and a non-rotatable pasteurizing plate spaced from the rotatable pasteurizing plate, and means for adjusting the non-rotatable plate to and from the rotatable pasteurizing plate.

18. In an apparatus for pasteurizing liquid, the combination of a rotatable chamber one of the outer walls of said chamber constituting a pasteurizing plate, a non-rotatable pasteurizing plate spaced from the rotatable one, means for adjusting the non-rotating pasteurizing plate to and from the rotatable plate, a liquid receiving receptacle located adjacent to the rotatable pasteurizing plate, means for holding the degree of temperature of the liquid receiving receptacle below the atmospheric temperature.

19. In an apparatus for pasteurizing liquid, the combination of two liquid retaining chambers, the adjacent walls of said chambers constituting pasteurizing plates, one of the chambers and its plate adjustable from the other, means for rotating one of the chambers, means for maintaining the water within the chambers at the desired degree of temperature, and means for directing the liquid to be heated between the pasteurizing plates.

20. In an apparatus for pasteurizing liquid, the combination of two liquid retaining chambers, the adjacent walls of said chambers constituting pasteurizing plates, one of the chambers and its plate adjustable from the other, means for rotating one of the chambers, and means for maintaining the water within the chambers at the desired degree of temperature, means for directing the liquid to be heated between the pasteurizing plates, a cooler surrounding the pasteurizing plates, and arranged to have its cooling surface engage the particles of liquid thrown from said pasteurizing plates and means for maintaining the temperature of said cooling surface at the desired degree.

21. In an apparatus for pasteurizing liquid, the combination of a centrifugally operated water receptacle having a horizontally disposed pasteurizing plate adapted to receive the liquid to be treated, and connected with the other walls of the vessel by fluid-tight joints, an annular trough arranged adjacent to the periphery of said pasteurizing plate, means for introducing water into and withdrawing water from said water receptacle, said water receptacle and water-introducing and withdrawing means being arranged to prevent any vapor from said water receptacle from escaping into the said trough, means for rotating said water receptacle, and means for directing the liquid to be treated on to said pasteurizing plate.

22. A device of the class described comprising a rotatable sealed tank the top whereof constitutes a treating plate for the reception of a liquid to be treated transversely-arranged with respect to the axis of rotation of said tank, a collecting trough surrounding said tank for receiving the liquid from said treating plate, means for introducing to said tank a heating medium, and means for rotating the same.

23. A device of the class described comprising a rotatable member, means for rotating the same, a sealed tank mounted on said member arranged to move in unison therewith the top of which constitutes a treating plate, a collecting trough surrounding said treating plate arranged to receive liquid therefrom, means to introduce a heating medium to said tank, and means to deposit liquid to be treated on the central portion of said treating plate.

24. A device for the pasteurization of liquids comprising a closed rotatable tank the top of which is arranged to constitute a treating plate, means for receiving a liquid driven from said top by centrifugal force, means for controlling the temperature of said treating plate, and means for rotating the same.

25. In an apparatus for pasteurizing liquid, the combination of a rotatable pasteurizing wall over which the liquid to be treated travels, means for rotating said wall, a second wall spaced from said rotating pasteurizing wall, and means for adjusting one of said pasteurizing walls relative to the other one, to vary the width of the space between them.

26. In an apparatus for pasteurizing liquid, the combination of a rotatable pasteurizing wall over which the liquid to be treated travels, means for rotating said wall, a second wall spaced from said rotating pasteurizing wall, means for adjusting one of said pasteurizing walls relative to the other one to vary the width of the space between them, and means for maintaining the temperature of said walls at the desired degree.

27. In an apparatus for pasteurizing liquids, the combination of a horizontally disposed rotatable pasteurizing plate, means for rotating said plate, a liquid distributing element axially alined with said rotatable plate, and means for adjusting said liquid distributing element to and from said rotatable plate.

28. In an apparatus for pasteurizing liquids, the combination of a horizontally disposed rotatable pasteurizing plate, means for rotating said plate, a second pasteurizing plate spaced from the first one, a liquid distributing element arranged in axial alinement with said rotatable plate and between it and the other plate, and means for adjusting said liquid distributing element relative to said plate.

29. In an apparatus for pasteurizing liquid, the combination of a horizontally disposed rotatable pasteurizing plate, means for collecting liquid delivered from the periphery of said plate, a receptacle secured by fluid tight joints to said pasteurizing plate, means for rotating said receptacle, means for directing the liquid to be treated on to said pasteurizing plate, and means for introducing a heating medium into and withdrawing it from said receptacle arranged to prevent the escape of vapor into the film of treated liquid discharged from the periphery of the pasteurizing plate.

30. In an apparatus for pasteurizing liquid, a steam tight receptacle having a horizontally disposed top wall which constitutes a pasteurizing plate, a trough arranged to receive the liquid delivered from the periphery of said pasteurizing plate, means for introducing a heating medium into said receptacle and withdrawing it therefrom and for preventing the escape of vapor from the receptacle through the film of liquid delivered from the periphery of said pasteurizing plate, and means for rotating said water receptacle.

31. In a pasteurizing apparatus, the combination of a steam tight receptacle having a horizontally disposed top wall which constitutes a pasteurizing plate, means for collecting liquid delivered from the periphery of said pasteurizing plate, means for introducing a heating medium into said receptacle, means for discharging liquid from said receptacle arranged to prevent the escape of vapor from said receptacle into the film of liquid delivered from the periphery of said pasteurizing plate, and means for rotating said receptacle.

32. In a pasteurizing apparatus, the combination of a steam tight receptacle having a horizontally disposed top wall which constitutes a pasteurizing plate, means for collecting liquid delivered from the periphery of said pasteurizing plate, means arranged at the axial center of said receptacle for introducing a heating medium into said receptacle and for permitting it to escape therefrom, and means for rotating said receptacle.

33. In an apparatus for pasteurizing liquid, the combination of a rotatable pasteurizing wall, means for maintaining the temperature of said wall at the desired degree, means for rotating said wall, a cooler encircling said pasteurizing wall and having its cooling surface in the path of travel of the particles of liquid as they are thrown from said pasteurizing wall, and means for maintaining the temperature of said cooling surface at the desired degree.

In testimony that I claim the above, I have hereunto subscribed my name in the presence of two witnesses.

LEROY S. PFOUTS.

Witnesses:
SYLVIA BORON,
F. W. BOND.